United States Patent [19]

Parish et al.

[11] 4,030,639

[45] June 21, 1977

[54] CHARCOAL ADSORBER FILTER FILL SYSTEM

[75] Inventors: Harold Cheney Parish, Upper Arlington; Michael Duane Allard, Columbus; Jack Leland Pettit, Columbus; Ivars Sigurds Spulgis, Columbus, all of Ohio

[73] Assignee: Pennwalt Corporation, Philadelphia, Pa.

[22] Filed: Apr. 28, 1975

[21] Appl. No.: 572,580

[52] U.S. Cl. .............................. 222/189; 222/193; 222/547; 222/556; 222/561; 222/564; 222/565; 141/286

[51] Int. Cl.² .................... B65D 47/08; B67D 5/08

[58] Field of Search .......... 222/189, 485, 556, 561, 222/547, 564, 565; 141/286; 302/21, 23, 58; 210/456

[56] References Cited

UNITED STATES PATENTS

| 908,991 | 1/1909 | Hammer | 302/58 X |
|---|---|---|---|
| 1,648,720 | 11/1927 | Clapper | 222/189 X |
| 1,733,905 | 10/1929 | Randolph | 222/556 X |
| 1,956,310 | 4/1934 | Boyd | 222/561 X |
| 1,980,049 | 11/1934 | Gainer | 222/561 X |
| 2,511,089 | 6/1950 | Zahner | 222/189 |
| 2,564,189 | 8/1951 | Daniell | 222/556 X |
| 2,662,671 | 12/1953 | Almas | 222/556 X |
| 2,913,150 | 11/1959 | Seale | 222/556 X |
| 3,731,855 | 5/1973 | Vos | 222/561 X |
| 3,884,528 | 5/1975 | Shaddock | 302/58 |

Primary Examiner—Drayton E. Hoffman
Assistant Examiner—Charles A. Marmor
Attorney, Agent, or Firm—Charles N. Quinn

[57] ABSTRACT

Apparatus is provided for use in filling charcoal adsorber air filter cells by dispersing the particulate charcoal into the filter while the apparatus is disposed vertically above the filter. The apparatus is particularly adapted to produce an even packing density of particulate charcoal in the filled air filter without the necessity of vibrating the air filter once the charcoal has been allowed to fill the filter to the top. A method is provided for semi-automatically, pneumatically filling the apparatus and the charcoal adsorber air filter. Some embodiments of the apparatus are adapted for filling two or more charcoal adsorber air filters simultaneously.

12 Claims, 20 Drawing Figures

CHARCOAL ADSORBER FILTER FILL SYSTEM

BACKGROUND OF THE INVENTION

1. Field of the Invention

The present invention is in the field of filling apparatus for filling receivers with granular material and more particularly in the field of apparatus for filling charcoal adsorber filters with granular charcoal. Specifically, the present invention relates to an apparatus for filling a granular charcoal filter adsorber apparatus with granular charcol, from above the apparatus, in such a fashion as to achieve a substantially uniform packing density of granular charcoal within the adsorber apparatus. The present invention also relates to a method for filling the fill apparatus with the granular charcoal which will minimize the time involved for this procedure. The present apparatus is most specifically designed to be used in conjunction with vertically oriented planar charcoal adsorber filter cells to achieve a uniform packing density of charcoal within such cells, thereby avoiding channeling effects when air is passed through the cells.

2. Description of the Prior Art

Apparatus for dispensing granular materials and for filling containers with granular materials have long been known and a variety of such apparatus has been used to perform the these tasks. Typical of these devices are the apparatus shown in U.S. Pat. No. 117,718, U.S. Pat. No. 335,709 and U.S. Pat. No. 2,511,089.

With evolving technology, the need has arisen for more sophisticated apparatus and specifically for apparatus to obtain a more sophisticated result, that being to achieve packing of the granular material in a substantially uniform fashion within a hopper, filter or other structure which is to be filled with granular material. This requirement is particularly acute in air filter systems using granular charcoal adsorbers for filtering radioactive materials out of the air in the case of an accident at a nucler power plant.

The U.S. Nuclear Regulatory Commission has issued Regulatory Guides which set forth general design criteria for the design of nuclear power plants and the allied equipment required thereby. One key system for the nuclear power plant is an atmospheric clean-up system for which general design guidelines are given in NRC Regulatory Guide 1.52. As an integral part of the atmospheric clean-up system, at least one adsorption unit is required for adsorbing radioactive materials from the air in the case of an accident. These adsorption units are manufactured in a variety of design configurations, two of which are described in U.S. PAT. Nos. 3,925,046 and 3,964,890. These charcoal adsorber units require that the charcoal adsorbent be filled in the adsorber unit from above the unit and that the filling result in a substantially uniform density of the charcoal adsorbent within the adsorber unit. This substantially uniform density prevents so called "channeling" whereby paths of low resistance are available for air passing through the adsorber unit. Such channeling is undesirable since air, to be properly filtered while passing through the adsorber, must spend a sufficient time in residence in the adsorber cells which are filled with charcoal so that radioactive wastes in the air can be adsorbed by the charcoal. Cells with channeling effects present do not achieve satisfactory residence time for the air passing through them; consequently, the air is not sufficiently purified and radioactive contaminants may remain in the air emerging from the adsorber.

In the past, it has been thought that by vibrating an adsorber unit, once it is filled with the granular charcoal, settling of the charcoal would occur thereby minimizing channeling effects. In fact, vibration of a filled cell of the adsorber apparatus may result in aggravating the channeling problem due to vibrational nodes in the cell structure with consequent non-uniform vibration of the adsorber unit and the charcoal therein.

Experiments have shown that the present invention not only provides a uniform packing density of charcoal adsorbent when utilized to fill a charcoal adsorber cell, but also achieves a greater packing density than is achieved by vibrating the cell. Such greater packing density enhances performance of the cell and has a further advantage in that by increasing flow resistance through the adsorber cell, the degree of low channeling, due to possible entrance and exit effects where the air enters and leaves the cell, is also decreased. Most importantly, the apparatus produces a very uniform packing of a charcoal adsorber cell and this results in a uniform flow resistance to air passing through the adsorber cell.

SUMMARY OF THE INVENTION

Heretofore, it is not been known to construct a fill hopper apparatus for use in filling charcoal adsorber cells with granular charcoal whereby the use of such a fill hopper results in a substantially uniform packing density of granular charcoal within the charcoal adsorber cell. The present invention provides a fill hopper apparatus which overcomes the aforementioned disadvantages and difficulties which are present in the prior art and which, when used, results in a substantially improved density and uniformity of filling of any charcoal adsorber cell which must be filled with charcoal from above the adsorber cell.

In accordance with the foregoing, it is a principal object of the present invention to provide a charcoal adsorber cell fill hopper apparatus which when used provides a controlled fill rate for the charcoal adsorbent filling the adsorber cell.

It is a further object of the present invention to provide a charcoal adsorber cell fill hopper which when used will assure substantially uniform distribution and density of the charcoal granular adsorbent within the adsorber cell.

It is a further object of the present invention to provide a charcoal adsorber cell fill hopper which may be utilized to fill one or more charcoal adsorber filter cells from above the cell so as to achieve maximum charcoal packing densities within the cells.

It is a further object of the present invention to accomplish the aforementioned objects without the need for vibrating the adsorber cells during or after filling with the charcoal adsorbent.

It is a further object of the present invention to utilize a series of holes and spaced screens and meshes to aid in the filling of granular charcoal adsorbent into a charcoal adsorber cell.

It is a further object of the present invention to provide a charcoal adsorber cell fill hopper which has optimally spaced screens or mesh so as to provide for a most uniform fill density of the granular charcoal adsorbent in the charcoal adsorber cell.

It is a further object of the present invention to accomplish the aforementioned objects while utilizing a plurality of screens and mesh means for achieving the uniform high packing density of the charcoal adsorbent.

It is a further object of the present invention to provide a charcoal adsorber cell fill hopper apparatus which when utilized to fill a charcoal adsorber cell with granular charcoal will result in filling the cell in such a way as to achieve minimized variations in air flow resistance through the adsorber cell.

It is a further object of the present invention to provide a means for pneumatically filling a charcoal adsorber fill hopper which accomplishes the above-cited objects.

It is a further object of the present invention to provide a closing means for optionally closing the dispensing holes in the charcoal adsorber fill hopper through which the charcoal adsorbent is dispensed.

It is a further object of the present invention to provide a method for filling a charcoal adsorber cell fill hopper with a granular charcoal adsorbent utilizing a pneumatic fill technique.

These and other objects of the present invention will be apparent to those of ordinary skill in the art from an inspection of the attached drawing figures and from a reading of the following specification and the appended claims.

The present invention, in the preferred embodiment, solves the problems present in the prior art by providing a generally trapezoidal-shaped hopper of suitable shape for fitting above one or more charcoal adsorber cells, with appropriate metering and dispersing means for metering the flow of granular charcoal out of the fill hopper and for dispersing the flow in a uniform pattern over a predetermined area, where the metering means and the dispersing means are optimally spaced one from another thereby providing an optimum distribution of charcoal adsorbent in the charcoal adsorber cell as the charcoal adsorbent fills the charcoal adsorber cell.

BRIEF DESCRIPTION OF THE DRAWINGS

In the drawings, identical numbers represent parts having identical or substantially similar names and/or functions in different embodiments of the present invention. Lower case alphabetic letters denote different embodiments of the present invention.

DESCRIPTION OF THE PREFERRED EMBODIMENTS

Figure 1:
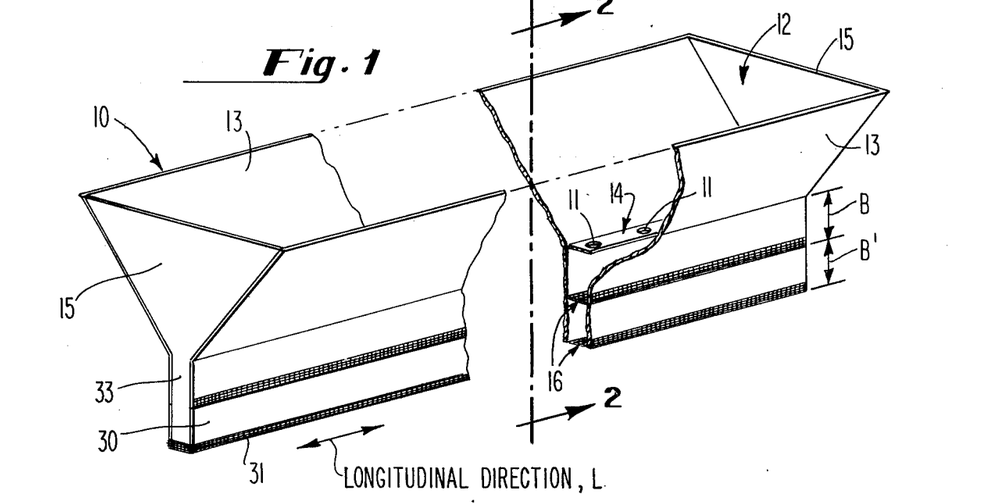
FIG. 1 is a broken-away isometric view of the apparatus for filling charcoal adsorber air filter cells with granular charcoal of the present invention, showing the simplest and most preferred embodiment of the present invention.

Reference is now made to FIG. 1 which illustrates the least complicated embodiment of the apparatus for filling charcoal adsorber filter cells of the present invention. A hopper designated generally as 12 is provided as a storage means for storing the granular charcoal in the apparatus for filling charcoal adsorber filter cells with charcoal, which has been designated generally as 10, where the hopper 12 generally comprises two end wall portions 15 and two side wall portions 13. The hopper is open at the top as can be seen from FIG. 1 and has at its bottom a metering means 14 which is in the form of a plate means with hole means 11 distributed therealong in the longitudinal direction of the apparatus 10 for filling charcoal adsorber filter cells with charcoal. The longitudinal direction has been designated by the double ended arrow L and it will be understood that when the longitudinal direction is referred to subsequently in this specification and in the appended claims, that a direction lengthwise along the apparatus 10 as shown by the arrows designated by the letter L is understood. Located immediately below the plate means or metering means 14 with the hole means 11 located therein, is at least one distribution means 16. In the embodiment of the present invention shown in FIG. 1, two distribution means 16 have been illustrated, one directly below the other. The distribution means 16 is generally a screen-like structure such as hardware cloth of suitable mesh size. The preferred mesh size characteristic of the distribution means are discussed hereinbelow. Extending below the metering means 14 are side wall guide means 30 for guiding falling charcoal granules so that the falling charcoal granules must pass through the distribution means 16. These side wall guide means may be either separate structures extending downwards from the hopper 12 or may be extensions of the hopper side wall 13. Similarly, end guide wall means 33 for guiding the falling charcoal granules as they fall downwardly may be separate structures attached to the end wall 15 of the hopper or may be extensions of the end wall 15 with the end wall 15 and the end wall guide means 33 being a single piece of material. The plurality of hole means 11 are disposed longitudinally along the metering means or plate means 14 for the passage therethrough of the charcoal granules. In the embodiment shown in FIG. 1, two distribution means 16 have been illustrated. Distribution means, of which one or more may be supplied, are generally screen-type structure, such as hardware cloth. However, it is to be understood that any suitable screen type or mesh structure can be utilized in the context of the present invention and that the present invention is not limited to hardward cloth-type screen as the distribution means.

Figure 2:
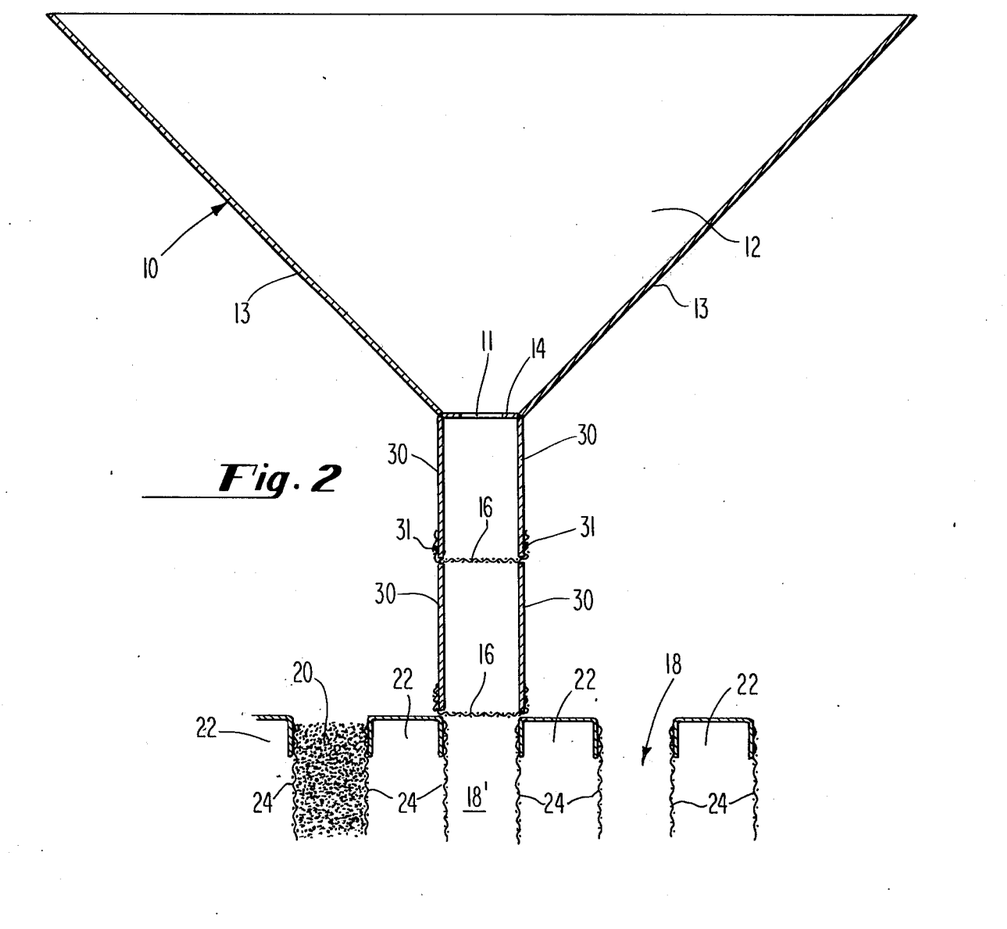
FIG. 2 is a sectional view taken along the lines and arrows 2—2 as shown in FIG. 1, showing the apparatus for filling a charcoal adsorber filter cell in place above an empty filter cell, ready to perform its filling function.

FIG. 2 is a sectional view of the apparatus for filling charcoal adsorber filter cells of the present invention, taken along the lines and arrows 2—2 of FIG. 1. Once again, the hopper 12, the hopper side walls 13, the metering means 14 and the two distribution means 16 are easily visible. The section has been taken through a hole means 11 in the metering or plate means 14. Also visible in this section are the side wall guide means 30 for guiding the falling charcoal granules as they pass through the hole means 11 and the distribution means 16. In the construction shown in FIG. 2, the distribution means are generally tack-welded to the side wall guide means 30; these tack-welds are designated 31. In FIG. 2, several charcoal adsorber cells are depicted below the apparatus 10 for filling the charcoal adsorber filter cells with charcoal, with a filled charcoal adsorber cell being shown as filled with granular charcoal 20 and with two empty charcoal filter cells 18 ready for the receipt of granular charcoal. The apparatus 10 for filling the charcoal adsorber filter cells has been placed in position over the empty adsorber cell 18' and in contact therewith. The side walls of the adsorber cells 20, 18 and 18' are shown as mesh side walls 24. Air passageways are designated 22. For a more detailed description of a typical adsorber cell which the apparatus 10 of the present invention might be used to fill, reference is made to U.S. Pat. Nos. 3,925,046 and 3,964,890.

Figure 3:
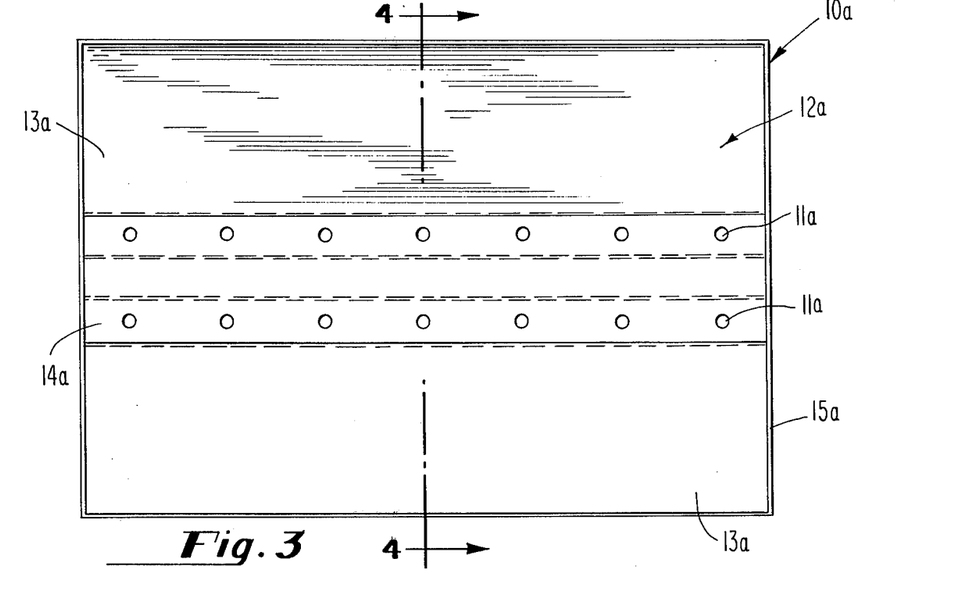
FIG. 3 is a top view of a second embodiment of the apparatus for filling charcoal adsorber filter cells of the present invention where the embodiment shown in FIG. 3 is suitable for the filling of two charcoal adsorber filter cells simultaneously.

Reference is now made to FIG. 3 which is a top view of a second embodiment of the apparatus for filling charcoal adsorber filter cells with charcoal of the present invention. The hopper means or storage means for storing the granular charcoal is again shown as 12a with two metering means 14a having symmetrically distributed therein holes 11a for the passage therethrough of the granular charcoal. The hopper 12a has side walls 13a and end walls 15a and an open top for receipt of the granular charcoal.

In the embodiment of the apparatus 10a shown in FIG. 3, the metering means or plate means 14a comprises a single plate with two symmetrically spaced groupings of holes 11a therein. Each set of holes is symmetrically spaced on two separate parallel center lines for filling two separate charcoal filter adsorber cells simultaneously. This arrangement is more clearly shown in FIG. 4.

Figure 4:
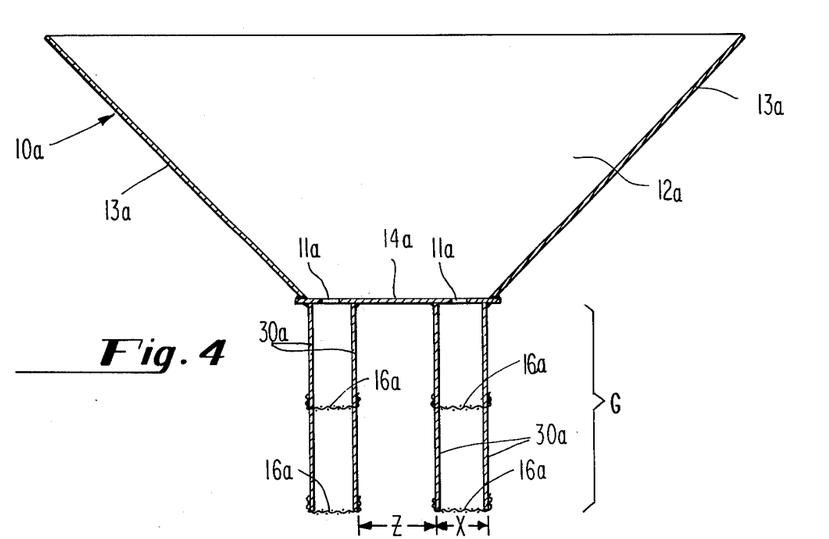
FIG. 4 is a sectional view of the embodiment of the apparatus for filling charcoal adsorber filter cells of the present invention as shown in FIG. 3, with the section taken along the lines and arrows 4—4 in FIG. 3.

FIG. 4 is a sectional view taken along the lines and arrows 4—4 of FIG. 3, showing the second embodiment of the apparatus 10a for filling charcoal adsorber filter cells with charcoal of the present invention. Again visible is the hopper 12a with its two side walls 13a and the bottom metering means or plate means 14a therein. As can be seen, the plate means 14a is sufficiently wide so as to encompass the width of two parallel charcoal adsorber filter cells, which are to be filled simultaneously, plus the distance between the two cells. The dimensional figure X has been included in FIG. 4 to denote the width of the charcoal adsorber filter cells which is to be filled and a dimensional figure Z has been included to denote the distance between two adjacent parallel charcoal adsorber filter cells. It is to be understood that the embodiment of the apparatus 10a for filling charcoal adsorber filter cells with charcoal shown in FIGS. 3 and 4 is designed to fill two charcoal adsorber filter cells simultaneously with charcoal. The two charcoal filling chutes, which are the downwardly projecting structures in the portion of the apparatus designated by the letter G and the bracket, are each comprised of side wall guide means 30a for guiding the falling charcoal granules into the adsorber filter cells over which the apparatus is positioned and at least one distribution means 16a is present in each chute for distributing the granular charcoal in a uniform density in the charcoal adsorber filter cells which are being filled.

Figure 5:
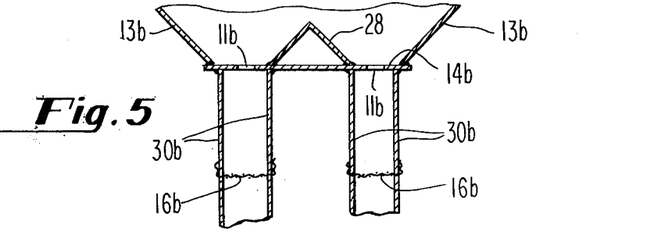
FIG. 5 is a broken-away sectional view of an alternative embodiment of the apparatus for filling charcoal adsorber filter cells which is quite similar to the embodiment shown in FIG. 3, where the section of FIG. 5 would be taken along the lines and arrows 4—4 in FIG. 3.

Reference is now made to FIG. 5 which is a partial broken section view of a bottom portion of a third embodiment of the apparatus for filling charcoal adsorber filter cells with charcoal of the present invention. The embodiment of the present invention shown in FIG. 5 is similar to that shown in FIG. 4 and in FIG. 3 with the addition of a ramp means 28 to assure complete emptying of the hopper upon the filling of any two chrcoal adsorber filter cells. In all respects other than the presence of the ramp means 28, the embodiment of the present invention shown in FIG. 5 is substantially the same as the embodiment of the present invention shown in FIGS. 3 and 4 and accordingly further discussion of the embodiment illustrated in FIG. 5 is not deemed warranted here.

Figure 6:
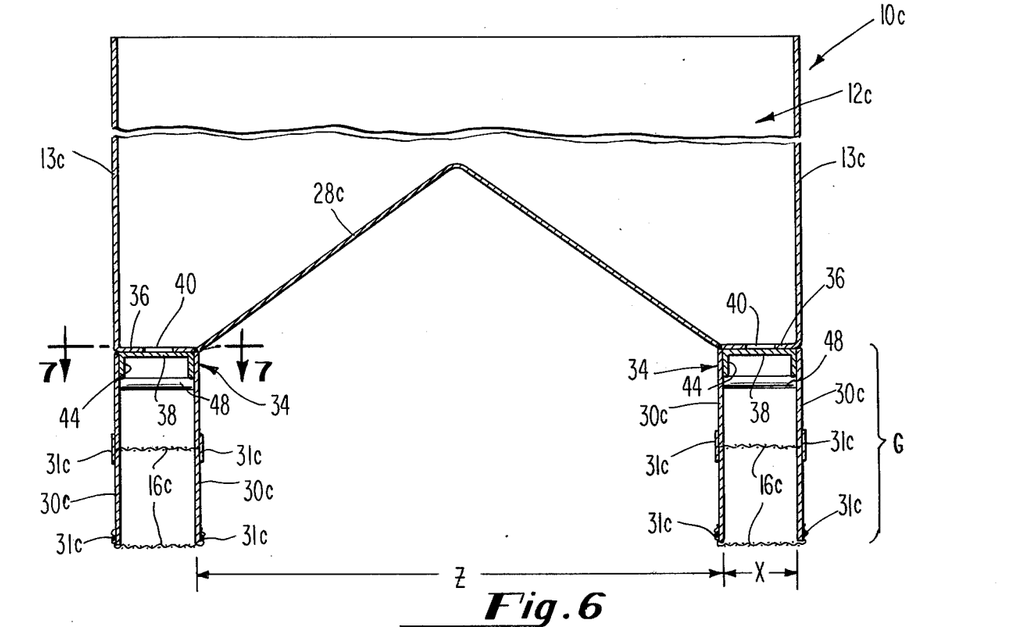
FIG. 6 is a sectional view of a third embodiment of the apparatus for filling charcoal adsorber filter cells of the present invention, where the apparatus as shown in FIG. 6 in sectional view is suitably disposed for the filling of two charcoal adsorber filter cells at the same time, in a manner similar to the apparatus shown in FIGS. 3, 4 and 5.

FIG. 6 illustrates a fourth embodiment of the apparatus 10c for filling charcoal adsorber filter cells with charcoal where the apparatus is shown in a broken sectional end view. The embodiment shown in FIG. 6 is designed to permit the simultaneous filling of one or two charcoal adsorber filter cells with charcoal where the adsorber filter cells are of width as designated by the letter X and are separated by the distance as designated by the letter Z. The apparatus of FIG. 5 again has a hopper means or storage means 12c for storing the granular charcoal prior to the release of the charcoal into the adsorber filter cells; this hopper means has side walls 13c and a bottom ramp means 28c to assure complete emptying of the hopper. Side wall guide means 30c for guiding the falling charcoal granules are provided as are distribution means 16c which again are secured to the side wall guide means by suitable means 31c. In the embodiment shown in FIG. 6, two distribution means 16c are illustrated in each filling chute area where the chute means are again designated by the letter G and the accompanying bracket. The embodiment of the present invention shown in FIG. 6 includes two gate means generally shown as 34 for optionally selectively permitting and preventing the flow of the granular charcoal adsorbent downward out of the hopper 12c and through the delivery chutes designated by the letter G and formed by the side walls 30c and the distribution means 16c. These gate means 34 are made up of a first plate means 36 having a plurality of holes 40 spaced longitudinally therein, a second plate means 38 which also has a similar plurality of holes 42 spaced longitudinally therein and support means 48 for supporting the gate means and more specifically for supporting the second plate means 38 of the gate means. The gate means is designed so that the second plate means can move on the support means 48 in a longitudinal direction, which, in FIG. 6, is the direction perpendicular to the plane of the paper. It is to be understood that the gate means are disposed for movement between two separate positions, one position which has been arbitrarily designated as a first position where the gate means is open and the plurality of hole means 40 are aligned with a plurality of hole means 42 so the charcoal can flow out of the filler hopper 12c, and a second position where the gate means is closed, the plurality of holes 40 are not aligned with the plurality of holes 42 thereby not permitting any charcoal to flow from the hopper 12c through the delivery chutes. The operation of the gate means will be understood fully upon study of FIGS. 7, 8 and 9 which are discussed below. It will be noted in connection with FIG. 6 that the second plate means 38 of the gate means 34 is comprised of a generally inverted U-shaped channel which is supported on the support means 48 for the gate means.

Figure 7:
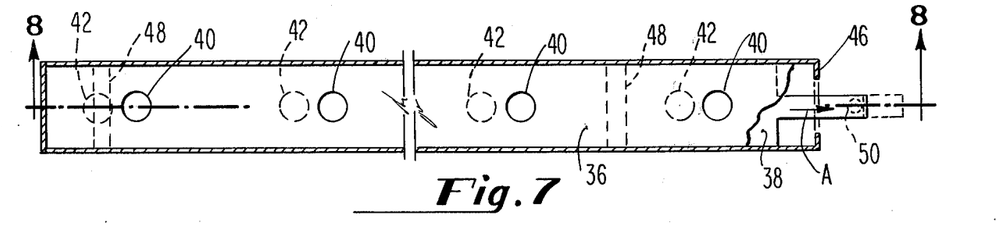
FIG. 7 is a broken sectional view taken along the lines and arrows 7—7 of FIG. 6 showing a portion of the gate means present in the apparatus of FIG. 6 which is used to optionally, alternately allow and prevent the downward flow of granular charcoal out of the apparatus.
Figure 8:
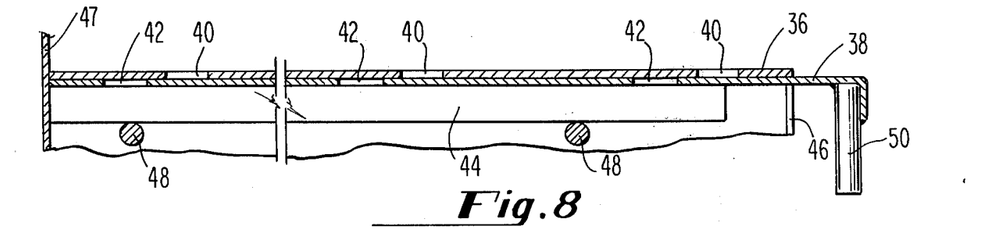
FIG. 8 is a partial, broken sectional view of a portion of the gate 15 means apparatus of FIG. 6, taken along the lines and arrows 8—8 of FIG. 7 showing the gate means apparatus in the position where no charcoal is allowed to pass through the gate means apparatus.
Figure 9:
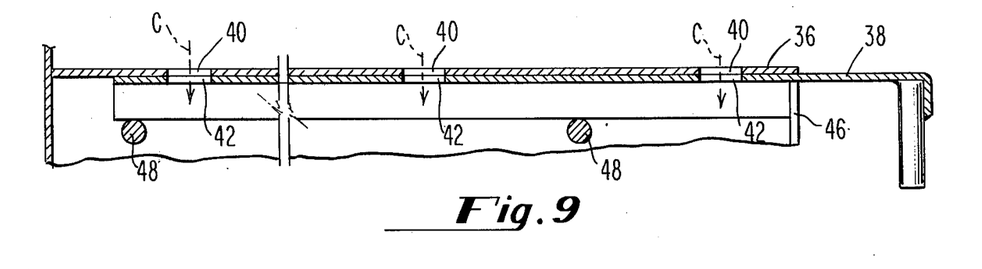
FIG. 9 is a partial, broken sectional view of the gate means apparatus of FIG. 6, taken along the lines and arrows 8—8 of FIG. 7 showing the gate apparatus in the position where charcoal is allowed to pass through the gate apparatus.

Reference is now made to FIGS. 7, 8 and 9. FIG. 7 is a sectional view of the gate means taken along the lines and arrows designated as 7—7 in FIG. 6. In FIG. 7, the gate means has been depicted in solid lines at its second or closed position which is the position at which charcoal cannot flow through the sets of holes 40 and 42 which are in the first and second plate means respectively, since these two respective sets of holes are not in alignment. The phantom lines of FIG. 7 depict the position of the second plate means 38 whereby the groups of holes 40 and 42 are in alignment, after the second plate means has moved to the right in the direction shown by the arrow A thereby permitting the downward flow (when viewed in FIG. 6) of the granular charcoal adsorbent out of the hopper. It will be understood that the metering or first plate means which has been designated as 36, remains stationary at all times and only the second plate means, which has been designated as 38, moves. This movement of the second plate means 38 is basically between two positions; these two positions are shown in FIGS. 8 and 9.

Both FIGS. 8 and 9 are sectional views of the gate means taken along the lines and arrows 8—8 as shown in FIG. 7. FIG. 7 shows the gate means in the second or closed position whereby charcoal is not permitted to flow downward out of the hopper and through the delivery chute due to misalignment of the pluralities or sets of holes 40 and 42. In FIG. 8, the support means 48 for the second plate means 38 are clearly shown as are the holes 40 in the first plate means 36, and the holes 42 in the second plate means 38. A handle 50 is provided for manually moving the gate means between the first and second positions. The side portions 44 of the second plate means, which form the U-shape of the channel, act in conjunction with first and second end stop means 46 and 47 to define the end limits of travel for the second plate means 38. When the second plate means 38 is at the position shown in FIG. 8, the end of the side portion 44 of the second plate means is abutting the second end stop means 47 and additional movement of the second plate means to the left in FIG. 8 is effectively prevented. Likewise, once the second plate means 38 is moved to the right, to the first or open position whereby the holes are aligned and charcoal can flow through them as shown in FIG. 9, the opposite end of the side portion 44 of the second plate means 38 abuts the first end stop 46 for the gate means or the second plate means, thereby limiting travel of the second plate means to the right as shown in FIG. 9. When the gate means has assumed the first or open position as shown in FIG. 9, the pluralities of holes 40 and 42 are all aligned and charcoal can flow downward out of the hopper as shown by the arrows associated with the letter C. Again, the second plate means has been moved on the support means 48. Although a handle means 50 has been shown for moving the second plate means between the first and second positions, it is specifically to be understood that any suitable means could be used, including pneumatic means, electric motor means, and various other power means which are well known in the mechanical arts, for affecting this motion. The means by which the second plate means is moved will depend upon the size in which the apparatus 10c is constructed. It is to be understood that the construction of the support means 48 and the first and second plate means 36 and 38 in the embodiment of the present invention shown in FIGS. 6, 7, 8 and 9 will be made with dimensions such that the first and second plate means 36 and 38 are substantially flush with one another, so that when the second plate means is in the second or closed position, a substantially air-tight seal is affected between the two plates and substantially no air can enter the hopper 12c through the holes 40.

Figures 10, 11, 12:
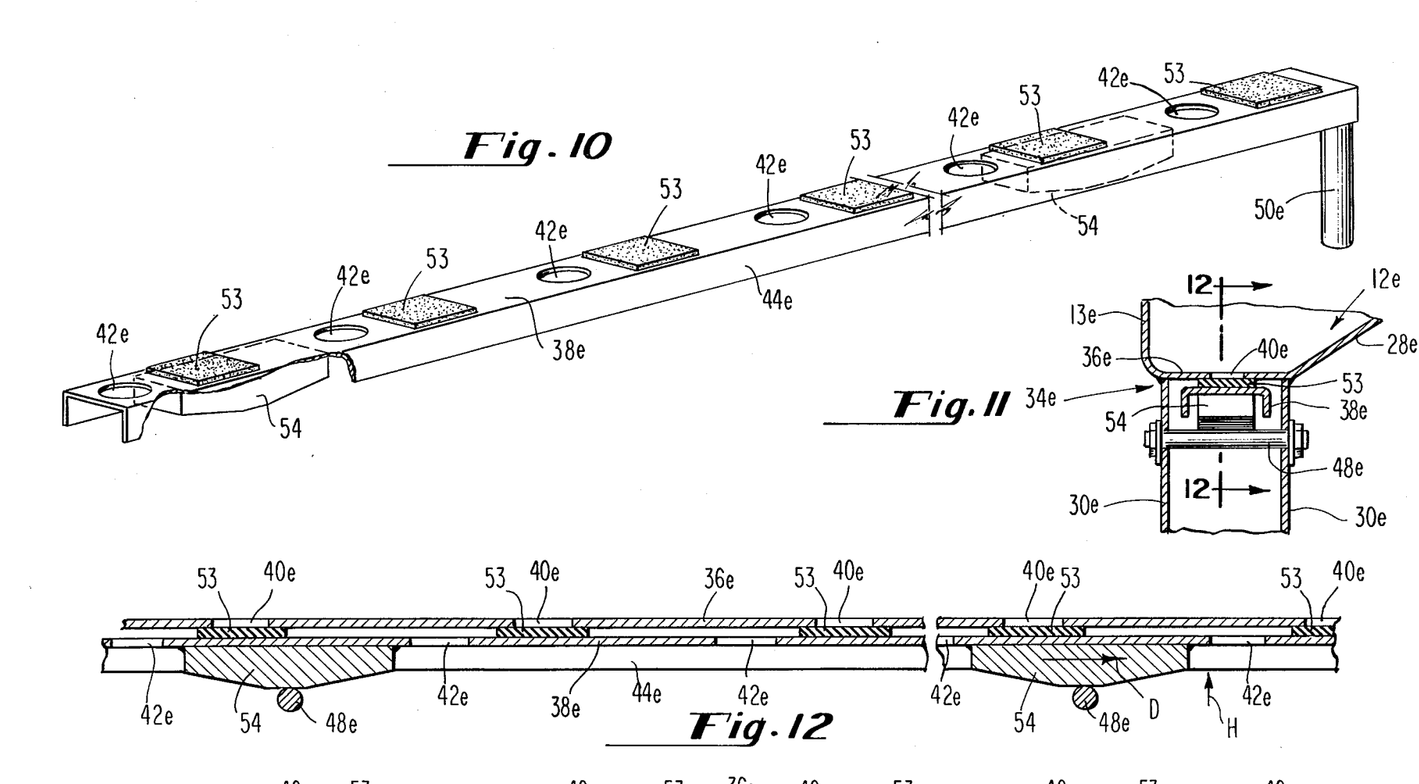
FIG. 10 is a partial, broken isometric view of a portion of a second embodiment of the gate means which is used for regulating the flow of charcoal out of the apparatus for filling charcoal adsorber filter cells.
FIG. 11 is a partial, sectional view of a second embodiment of the gate means used for controlling the flow of charcoal out of the apparatus for filling charcoal filter cells, showing the second embodiment of the gate means and utilizing the portion of the gate means shown in FIG. 10.
FIG. 12 is a partial, sectional view taken along the lines and arrows 12—12 of FIG. 11 showing the two plate means, the lower of which substantially comprises the gate means, in the position whereby no charcoal can flow out of the apparatus for filling charcoal adsorber filter cells.

Reference is now made to FIG. 10 wherein an additional embodiment of the present invention incorporating modifications to the second plate means is shown. In FIG. 10, there is shown the generally inverted U-shape channel which comprises the second plate means 38e having a side portion 44e, where the second plate means has been broken away partially to show the camming means 54. The caming means 54 operate in conjunction with the support means for the second plate means 48e, as will be seen more clearly in FIGS. 11, 12, 12A, to provide a vertical motion of the second plate means whenever the second plate means is moved horizontally between the first or open and second or closed positions to thereby affect a more air-tight seal at the holes 40e in the first gate means. Also shown in FIG. 10 are a plurality of holes 42e which, when aligned with holes 40e in the first plate means when the second plate means is at the first or open position, allowing the granular charcoal to flow therethrough thus permitting the charcoal to flow downward out of the hopper and through the delivery chute area. FIG. 10 also shows sealing pad means 53 which are positioned along the second plate means 38e in suitable spaced disposition for affecting air-tight seals at the holes 40e in the first plate means when the second plate means is at the second or closed position whereby charcoal cannot flow out of the hopper. The sealing pad means 53 are preferably made of a slightly deformable material such as hard rubber so as to affect the air-tight seal when in closed disposition with the holes 40e. The operation of the sealing pad means 53 will also be clear upon examination of FIGS. 12 and 12A. A handle means 50e is again provided for moving the second plate means 38e between the first or open and second or closed positions; again, it is to be understood that any suitable power means could be supplied to move the second plate means between the two positions. Such suitable power means include but are not limited to pneumatic means, solenoids, electric motors, rack and pinion means and the like. Suitable power means for moving the second plate means so that manual power is not required are well known in the mechanical arts and do not form any part of the present invention.

Reference is now made to FIG. 11 which is a partial sectional view of the bottom portion of the hopper 12e, the gate means 34e and the top portion of the delivery chute formed by the side wall guide means 30e for guiding the charcoal granules downward out of the hopper through the distribution means, which are not shown, and into the adsorber filter cell which is to be filled. Again, the hopper 12e has a side wall 13e and a ramp means 28e to assure substantially complete emptying of the hopper when charcoal granules are allowed to flow down through the chute means due to the gate means 34e being at the first or open position. The hopper further has a first plate means 36e which has a plurality of holes 40e therethrough where the first plate means 38e can be said to form a portion of the gate means shown generally as 34e. The second plate means 38e has attached thereto at the lower side or lower surface a camming means 54 and also has attached at the upper surface, the sealing pad means 53 as was shown in FIG. 10. The second plate means 38e either is supported on the support means 48e by the camming means 54 or the second plate means may rest directly on the support means 48e. This optional arrangement will be more clear when reference is made below to FIG. 12 and 12A. The delivery chute area is formed by the two side wall guide means 30e.

Figure 12A:
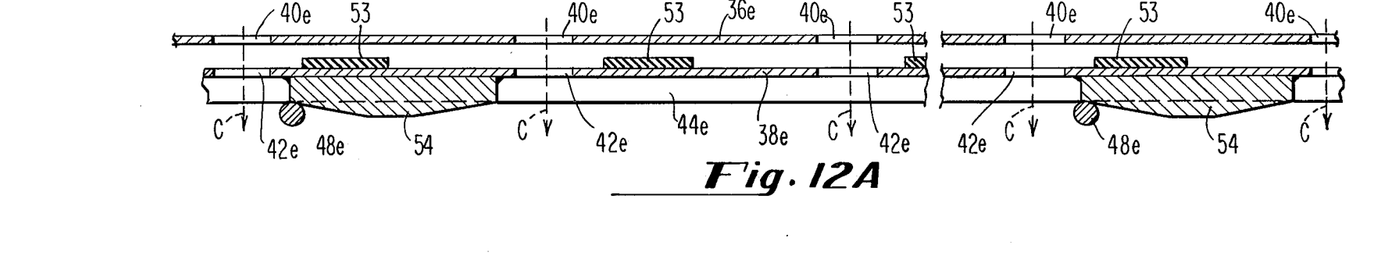
FIG. 12A shows the two plate means which substantially comprise the gate means for controlling the flow of charcoal out of the apparatus for filling charcoal adsorber filter cells, in a position where charcoal can flow out of the apparatus for filling charcoal adsorber filter cells.

Reference is now made to FIGS. 12 and 12A which are sectional views of the gate means in the second or closed and first or open positions respectively, taken along the lines and arrows 12—12 of FIG. 11. In FIG. 12 there is seen the second plate means 38e with the camming means 54 located on the bottom surface thereof with the plate means 38e having the sealing pad means 53 in abutted disposition with the first plurality of holes 40e in the first plate means 36e. The arrow associated with the letter D denotes the direction the second plate means 38e travels when it is moved from the second or closed position as shown in FIG. 12 to the first or open position as shown in FIG. 12A. Again, it is to be understood that the sealing pads are preferably made of a slightly deformable material so that when the second plate means is in the position shown in FIG. 12, due to the camming action of the camming means 54 in conjunction with support means 48e for the second plate means, an upward force in the direction of the arrow H is created on the second plate means, thereby forcing the sealing pad means into a slightly compressed disposition about the periphery of the holes 40e. One sealing pad means is positioned for sealing of each of the holes 40e which are spaced longitudinally along the first plate means 36e. Similarly, there are holes 42e which are suitably spaced for communicating disposition with each corresponding hole 40e, for the passage therethrough of granular charcoal in the first position of the gate means as shown in FIG. 12A. Indeed when the first and second plate means are respectively in the positions shown in FIG. 12A so that charcoal can flow therethrough, through the holes 40e and 42e as shown by the arrows associated with the letter C, the holes 40e and 42e are said to be in communicating disposition or communicating relation. In the situation depicted in FIG. 12A, the second plate means has been moved to the right relative to the position shown in FIG. 12, such that due to the camming action of the camming means 54 against the support means for the second plate means 48e, the holes 40e and 42e are not only aligned but the second plate means 38e has assumed a vertically lower disposition, further away from the first plate means 36e. Once the second plate means 38e has reached the position shown in FIG. 12A, whereby the second plate means either is supported directly by the support means 48 for the second plate means or only a small portion of the camming means 54 is between the support means 48 and the second plate means, the charcoal can fall through the communicating holes and the movement of the second plate means 38e is complete. It will be understood that suitable stop means, such as those shown in FIGS. 8 and 9 as 44, 46, and 47 may be utilized in conjunction with the embodiment of the present invention as shown in FIGS. 10, 11, 12 and 12A and that such means have not been shown in the embodiments of FIGS. 10, 11, 12 and 12A so as to aid the clarity of the drawings. It will be understood that the configuration of the sealing pad means is not limited to that shown in FIGS. 10, 11, 12 and 12A and that any suitable configuration may be used.

Figure 13:
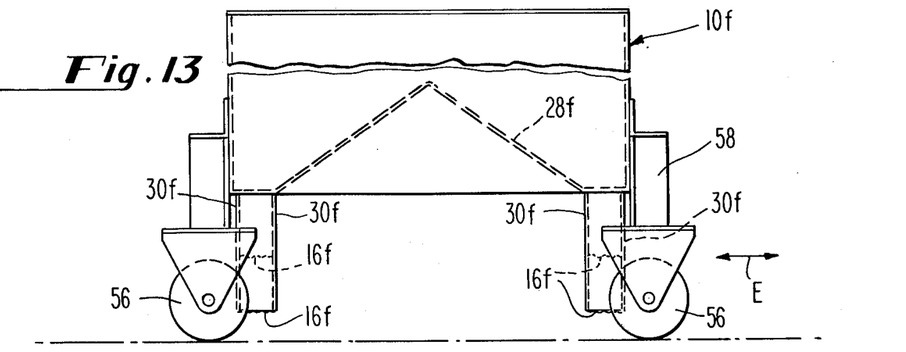
FIG. 13 is a broken, partial view of the apparatus for filling charcoal adsorber filter cells of the embodiment shown in FIG. 6, where the apparatus for filling charcoal adsorber filter cells of the present invention has been fitted with wheel means to facilitate the movement of the apparatus along the tops of the charcoal adsorber filter cells.

Reference is now made to FIG. 13 wherein there is shown an embodiment of the present invention quite similar to that shown in FIG. 6, where the apparatus for filling the charcoal adsorber filter cells with charcoal, designated generally as 10f, has been equipped with wheel means and wheel means mounting frames so as to facilitate the carriage of the apparatus 10f generally along the directions shown by the double ended arrow E. The distribution means 16f, the side wall guide means 30f for guiding falling charcoal granules into the charcoal adsorber filter cells and the ramp means 28f are substantially the same as those which have been described for previous embodiments of the invention and accordingly further discussion of these structures is not deemed warranted here. The wheel means 56 and the wheel means mounting frame means 58 are provided so as to allow the apparatus 10f to be easily moved along the top of a series of adjacent charcoal adsorber filter cells so that the filter cells can be easily filled without the necessity of laboriously moving the apparatus, which has been shown in the previous embodiment, by hand. Indeed if the adsorber filter cells which are to be filled are quite large, hand movement of the apparatus for filling charcoal adsorber filter cells, where the apparatus is not equipped with wheels such as are shown in FIG. 13, may be difficult.

Figure 14:
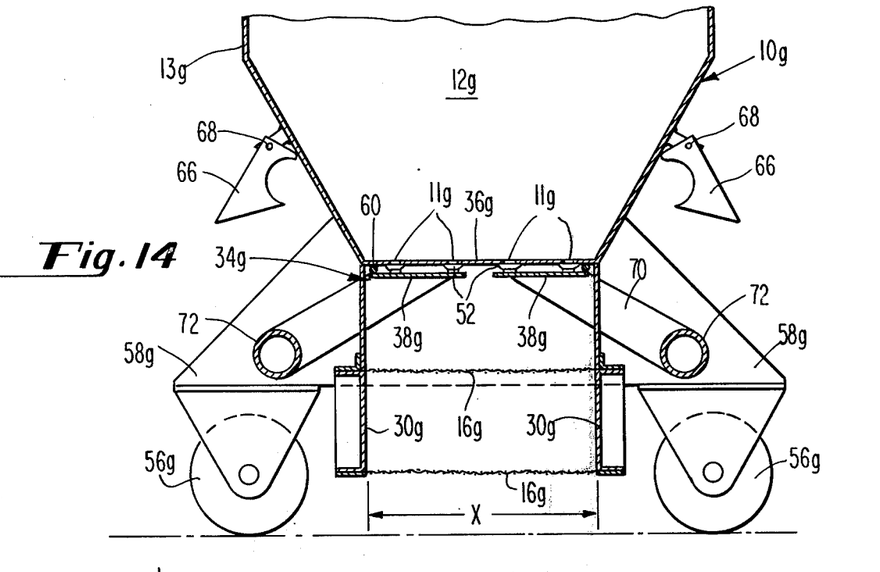
FIG. 14 is a partial section view of yet another embodiment of the apparatus for filling charcoal adsorber filter cells of the present invention, which utilizes wheel means to move the apparatus along the tops of the filter cells which are to be filled and which employs a hinged gate means to control the flow of charcoal adsorbent out of the apparatus for filling charcoal adsorber filter cells.

FIG. 14 illustrates yet another embodiment of the apparatus for filling charcoal adsorber filter cells with charcoal, where the apparatus of the present invention in this embodiment has been designated generally as 10g. In this embodiment, the hopper 12g has side walls designated 13g and a bottom portion comprised partly of a metering means or a first plate means 36g. The first plate means 36g has a plurality of symmetrically spaced holes therein designated as 11g for the passage therethrough of the granular charcoal. In FIG. 14, the gate means, which are designated generally as 34g, are disposed for pivoting movement about hinge means 60 so as to move between the first or open and second or closed positions. The embodiment of the present invention shown in FIG. 14 is shown in a closed position where both second plate means 38g have been pivoted about the hinge points 60 so that sealing cap means 52 have effectively sealed the plurality of holes 11g and no charcoal can escape from the hopper 12g. The gate means, which has been designated generally as 34g, not only comprises the second plate means 38g, the first plate means 38g, and the sealing cap means 52, but also a connecting arm 70 connected to a ratchet mate means 72 which is suitably disposed for optional engagement with a swinging ratchet 66 which is mounted from a ratchet hinge 68.

In the embodiment shown in FIG. 14, the width of the charcoal adsorber filter cell to be filled has again been designated by the dimensional figure X and it is seen that the embodiment shown in FIG. 14 utilizes four separate rows of holes 11g to fill the charcoal adsorber filter cell. Again, as in previous embodiments, at least one distribution means 16g is disposed below the first plate or metering meas 36g and side wall guide means for guiding the falling charcoal granules 30g are also provided for guiding the granules on their downward path. The hopper is again mounted on wheel means 56g by way of wheel means mounting frame means 58g. Although the apparatus 10g shown in FIG. 14 has been shown with two separate hinged second plate means 38g, it is to be understood that the apparatus could be constructed with only a single hinged second plate means and with only one or two rows of holes for distributing the charcoal granules. All these variations are within the contemplation of the present invention.

Figure 15:
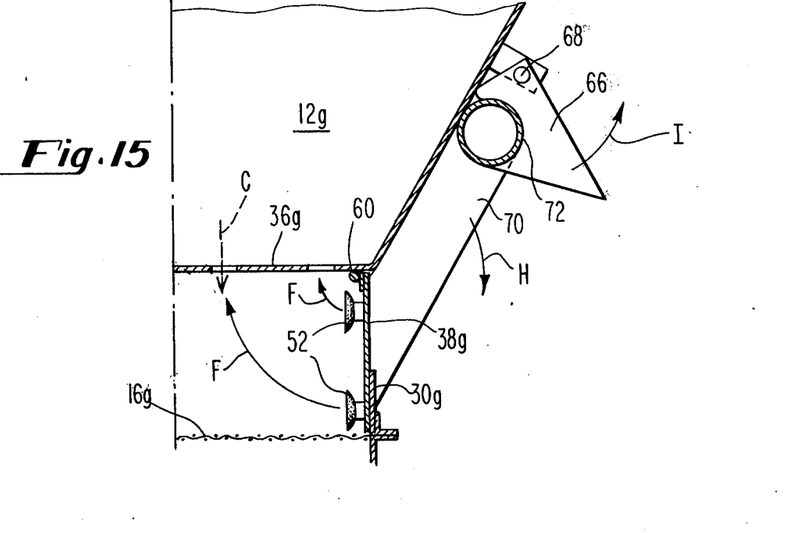
FIG. 15 is a partial broken sectional view of the apparatus for filling charcoal adsorber filter cells of FIG. 14, showing the gate means which is used to regulate the flow of charcoal out of the apparatus for filling charcoal adsorber filter cells, in a different position from that shown in FIG. 14, whereby charcoal is permitted to flow downward out of the apparatus for filling charcoal adsorber filter cells.

FIG. 15 shows the position of one of the second plate means 38g when it has been moved to the first or open position whereby charcoal can flow downward out of the hopper 12g. As can be seen, the second plate means 38g, the sealing cap means 52, the connecting arm 70 and the ratchet mate means 72 have all been rotated about the hinge means 60 thereby allowing charcoal to flow downward out of the filler hopper as denoted by the arrow C. The swinging ratchet 66 retains the ratchet mate means 72 due to the complemental fitting of the ratchet about the ratchet mate means so long as it is desired to permit charcoal to flow downward out of the hopper. When it is desired to stop the flow of charcoal, the operator merely swings the swinging ratchet in the direction denoted by the arrow I. This releases the ratchet mate means 72 and, since the ratchet mate means generally will be constructed so as to be of a sufficient weight so as to more than counter-balance the plate means 38g and the sealing cap means 32, the ratchet mate means 72 and the connecting arm 70 swing clockwise about hinge means 60, as shown by the arrow H. This results in the sealing cap means 52 rotating in the clockwise direction about the hinge means 60 as shown by the arrows F, thereby returning the sealing cap means and the second plate means 38g to the position shown in FIG. 14 thus placing the apparatus in the second or closed position whereby charcoal is not permitted to flow out of the hopper. To permit charcoal to flow out of the hopper, an operator merely need grasp the ratchet mate means 72 and swing it in a direction opposite to that shown by the arrow H in FIG. 15 until it engages the swinging ratchet 66 and is retained thereby. The apparatus will again be at the first or open position, as shown in FIG. 14 and charcoal can flow out.

Figure 16:
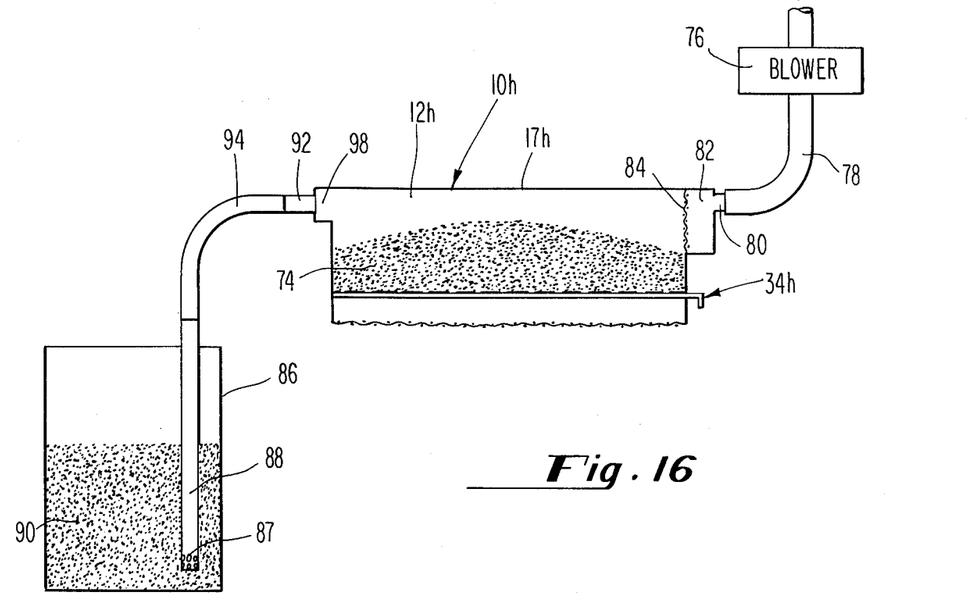
FIG. 16 is a schematic view of apparatus for pneumatically filling the filling apparatus with charcoal, with the apparatus for filling the charcoal adsorber filter cells partially broken away, showing the arrangement of equipment for pneumatically filling the apparatus with granular charcoal.

FIG. 16 is a schematic representation of apparatus which is utilized to fill any of the embodiments of the apparatus for filling charcoal adsorber filter cells with charcoal of the present invention, using a pneumatic technique, thereby avoiding the manual labor of lifting bags of granular charcoal above the apparatus and dumping the contents of the bags into the apparatus. In FIG. 16, a generalized apparatus 10h which could be any enbodiment of the present invention, has been shown partially broken away, having a hopper 12h and a gate means 34h for optionally alternately preventing and permitting the flow out of the hopper of the granular charcoal therein which has been designated as 74.

Continuing with reference to FIG. 16, it is to be understood that the apparatus 10h for filling the charcoal adsorber filter cells with charcoal, the hopper means or storage means 12h, a top cover 17h for the hopper and the gate means which has been shown generally as 34h could be any of the embodiments of the present invention previously described and that the particular embodiment shown in FIG. 16 is intended to be symbolic of a general embodiment so as to illustrate the apparatus and method by which the apparatus for filling charcoal adsorber filter cells with charcoal of the present invention may be itself filled with charcoal using a pneumatic technique. In this connection, it will be noted that the apparatus 10h shown in FIG. 16 has been broken away at the bottom so that this apparatus may depict any of the particular apparatus which has been previously described and indeed it is to be understood that the apparatus and method for loading charcoal into the filling apparatus 10h is applicable to all of the previous embodiments which have been described, where these embodiments are equipped with structural modifications for connection with a blower and a supply of charcoal as will be described hereinbelow.

Figure 17:
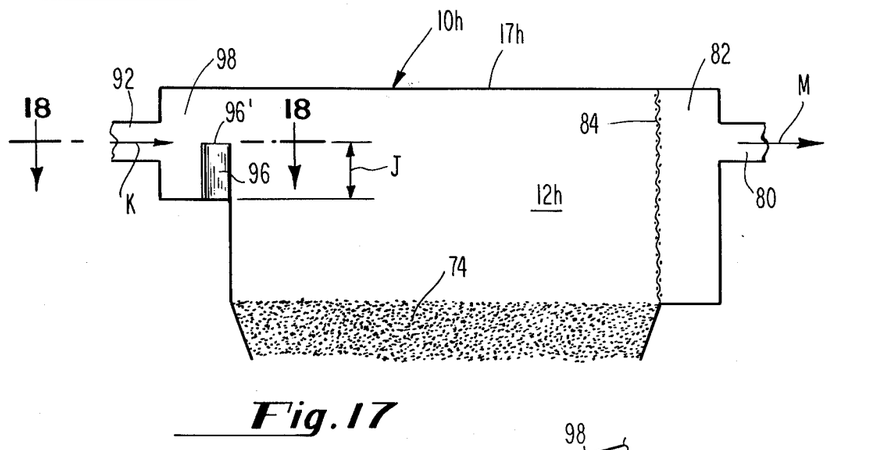
FIG. 17 is a broken view of the apparatus for filling the charcoal adsorber filter cells with charcoal where the apparatus has its upper, hopper portion suitably disposed for the automatic, pneumatic filling thereof with granular charcoal, utilizing a suitable arrangement of apparatus similar to that shown in FIG. 16.

Still referring to FIG. 16, there is shown a charcoal container 86 having a supply of granular charcoal 90 therein and having a charcoal suction tube 88 thrust downward into the charcoal 90 and the charcoal container 86. The charcoal container 86 has an open top so that ambient air can enter into the charcoal container and surround the charcoal granules therein. The charcoal suction tube 88 is connected by a hopper inlet hose 94 to a hopper inlet neck 92. This hopper inlet neck extends from a portion of the hopper 12h which has been designated as a hopper inlet plenum 98; this plenum is shown in greater detail in FIGS. 17 and 18. The hopper itself is equipped with a top cover 17h which is secured to the top of the hopper in substantially an air-tight fashion. This may be accomplished by the use of any conventional means including screws, nuts, bolts and the like and a gasket may or may not be used. At the right hand side of the hopper as seen in FIG. 16, there is a hopper outlet plenum designated generally as 82 and a hopper outlet filter screen 84. A hopper outlet neck 80 is used to connect the hopper outlet plenum 82 via a hopper outlet hose 88 to a suction side of a blower designated generally as 76. Reference is now made to FIG. 17 wherein the top section of the hopper 12h of the apparatus 10h of the present invention, which was shown in FIG. 16, is shown in more detail so as to more clearly illustrate the details of the inlet plenum, the outlet plenum and the associated structure therein which is required for successful operation of the pneumatic filling system of the present invention. In FIG. 17, there is again shown the broken away top portion of the hopper 12h with the hopper inlet neck 88 leading into hopper inlet plenum 98 and with the hopper outlet neck 80 leading out of the hopper outlet plenum 82. Proximate to the hopper inlet neck 92, located in the hopper inlet plenum 98 are disposed two inlet baffles designated 96. These baffles are of suitable height denoted by the dimensional letter J, so that the top-most portion of the baffle, which is designated 96', intersects with the center of the flow of the incoming charcoal-air mixture. The charcoal-air mixture will enter the hopper 12h through the hopper inlet neck 92 in the direction indicated by the letter K and a portion of this charcoal-air mixture will intersect with the baffle 96 thereby dispersing all of the channel throughout the interior of the hopper 12h.

At the outlet end of the hopper, there is a hopper outlet screen 84 which is of sufficiently small size such that charcoal particles in the charcoal-air stream cannot pass therethrough as the air from the charcoal-air mixture is sucked out through the hopper outlet neck 80 in the direction shown by the arrow designated by the letter M. Charcoal which strikes the hopper outlet filter screen 84 will fall into the hopper in the position of the charcoal 74. Some of the charcoal in the incoming charcoal-air stream will fall due to the force of gravity, as the air velocity decreases, due to the air suddenly entering a larger volume, that being the hopper volume, compared to the cross-sectional area and consequent smaller volume of the inlet hose 94. Accordingly, it has been found that with an arrangement of structure including the hopper top, the inlet and outlet plenums, the filter screen and the baffles such as shown in FIGS. 16, 17 and 18, a substantially uniform distribution of the charcoal in the hopper 12h is obtained.

Figure 18:
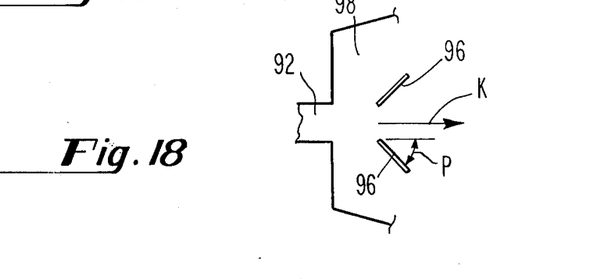
FIG. 18 is a partial sectional view taken along the lines and arrows 18—18 of FIG. 17 showing the arrangement of the hopper inlet neck and inlet baffles for distributing the granular charcoal within the hopper storage means portion of the apparatus for filling charcoal adsorber filter cells when the pneumatic technique for filling the hopper with the granular charcoal is used.

Reference is now made to FIG. 18 which is a broken partial sectional view taken along the lines and arrows 18—18 of FIG. 17. In FIG. 18, there is again shown a hopper inlet neck 92 and a hopper inlet plenum designated as 98. The two inlet baffles 96 can be seen and it is apparent that each inlet baffle is mounted so as to form an angle P with the direction of flow vector of the incoming charcoal air stream; this direction of flow has been designated by the arrow K. During operation of the apparatus as depicted in FIG. 16, it has been found that once one connects the charcoal container with the charcoal therein to the apparatus of the present invention via the inlet hose 94 and connects the apparatus of the present invention via the outlet hose 78 to the suction side of the blower 76, upon actuating the blower, where the blower is of sufficient suction capacity, granular charcoal of the size which is ideally distributed by the apparatus of the present invention into the charcoal adsorber filter cells, will be drawn through the hose 94 and dispersed in the hopper 12h. It has been found that is is necessary to put a top 17h on the hopper 12h and it is desirable to close the gate means which has been designated generally as 34h so as to provide as much of an air-tight seal at the gate means as is possible so as to force substantially all of the air, which is drawn by the blower through the hopper, to come into the hopper via the inlet hose 94. This air draws the granular charcoal with it through the charcoal suction tube 88 since the charcoal suction tube has holes only at the end which is disposed deep within the charcoal 90 which is in the charcoal container 86. These holes are denoted as 87. Furthermore, it has been found that once the hopper is completely filled with charcoal, all the way up to and touching the top 17h, that the blower may be allowed to continue to run without damage to the system because air will be drawn around and through the charcoal in the charcoal container, through the hose 94 and through the charcoal which has filled up the hopper 12h by the blower 76 without damage to the blower. This has proven to be quite advantageous since this characteristic means that it is not necessary for the apparatus of the present invention to be continually attended by a human operator during filling of the hopper 12h with charcoal using this penumatic technique.

Figure 19:
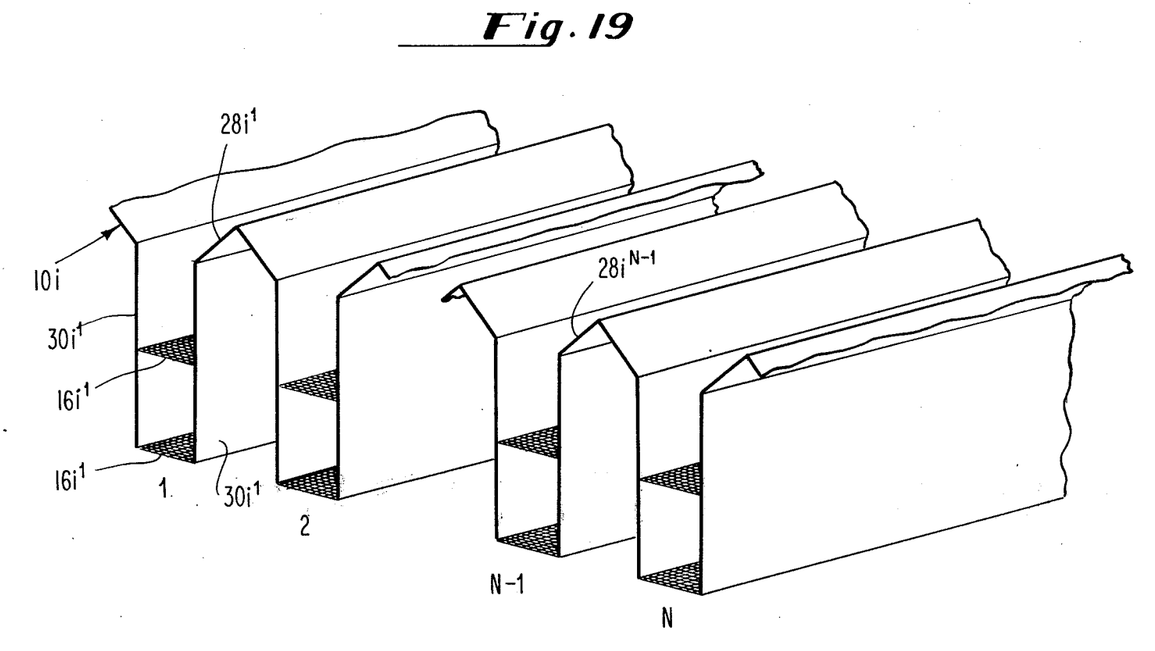
FIG. 19 is a broken, isometric view of a generalized embodiment of the apparatus for filling charcoal adsorber filter cells of the present invention.

Reference is now made to FIG. 19 which is a schematic representation of an apparatus for simultaneously filling an arbitrary number of charcoal filter cells where the number of such filter cells has been designated as N. The apparatus shown in schematic representation in FIG. 19 is similar to that shown in FIGS. 1, 2, 3, 4, 5 and 6 and it is to be understood that any of the embodiments of the charcoal adsorber fill system which have been shown in the drawings and described in the specification can be constructed in such manner so as to fill any chosen number N of charcoal adsorber filter cells simultaneously. In FIG. 19 the numbers 1, 2 . . . N-1, N represent the number of the particular adsorber filter cell which is being filled. The apparatus for filling the N charcoal adsorber filter cells is designated generally by the number 10$i$. 28$i^1$ represents the ramp means which is disposed between the first and second metering means for filling the first and second adsorber cell. Similarly 28$i^{N-1}$ represents the N-1th ramp means which is disposed between the N-1 and N metering means for filling the N-1 and N adsorber cells. The side wall guide means 30$i^1$ denote the side wall guide means associated with the first charcoal adsorber filter cell and similarly the distribution means 16$i^1$ represent the distribution means for the first charcoal adsorber filter cell. Similarly, identical structures are provided for cells 2, . . . N-1 and N and it is to be understood that structure according to the various embodiments of the invention which have been shown in the previous drawings and described heretofore could be constructed and linked together similarly to the structure of FIG. 19. Accordingly, any of the embodiments shown herein can be constructed in such a way as to fill any given number of charcoal adsorber filter cells at a given time. Likewise, individual control of N gate means, which have not been shown to aid the clarity of the drawing, can be affected in those embodiments of the present invention which have gate means present, so as to permit the filling of any number of filter cells simultaneously, from 1 up to N, where the apparatus is constructed with N filling chutes so as to be able to fill N filter cells simultaneously if desired.

It is to be understood that the present invention in any of its embodiments is not limited in any way by dimensions or number of hole means 11 or the number of distribution means which have generally been shown in all embodiments as 16. However, it is believed that the recitation of typical numbers for these dimensions will enable those of skill in the art to better understand the present invention. Typical hole diameters and spacings which have been used for the hole means 11 are ½ inch, ¾ inch, and 1 inch diameter sizes with such holes being spaced with center spacings in the neighborhood of 5 and ¼ inches. The inlet and outlet ports or necks 92 and 80 have typically been manufactured in 2 inch, 3 inch and 3 and ½ inch sizes. The screens for distribution means designated generally as 16 have generally been 4 × 4 mesh hardware cloth corresponding to ASTM standards where 4 × 4 mesh denotes hardware cloth with strands spaced every ¼ inch. The particular charcoal which has been generally used for filling with this apparatus has been charcoal which is designated as having mesh size 8 × 16. This denotes charcoal which can pass freely through a mesh having 8 strands per inch but which will be blocked by a mesh having 16 strands per inch. The charcoal adsorber filter cells which have been filled have typically been in the neighborhood of 2 inches wide, as shown by the dimension X in FIG. 4, by up to 5 feet in length. Also, charcoal adsorber filter cells up to 6 and even 8 inches in width have been filled using appropriately sized apparatus of the present invention. Typically the distribution means 16 are spaced vertically as shown by dimensional letter B in FIG. 1 on the order of 3 to 4 inches, with 3 and ½ inches being a preferred dimension. Where a 2 inch wide filter cell has been filled, typically only a single row of holes have been utilized in the metering means while where a six inch width filter cell has been filled, the metering means has commonly had two rows of ½ inch holes each spaced on approximately 3 and ½ inch centers, with the two rows centered over the filter cells to be filled and spaced three inches apart. Again, it must be emphasized that all these dimensional figures are given as typical dimensions and are in no way construed to be limiting the scope of the present invention. Indeed, the scope of the present invention is to be construed solely by the appended claims when read in light of this specification and the attached drawings.

1. Apparatus for filling filter cells with granular adsorbent material from above the cells to obtain uniform density in the cells, comprising:
   a. a horizontally elongated hopper for containing granular adsorbent material, said hopper including a metering plate extending longitudinally substantially the length of said hopper and forming a portion of the bottom of said hopper, said metering plate having a first plurality of holes therein for flow therethrough of granular adsorbent material downward out of said hopper;
   b. a pair of side walls, each wall extending downward from said bottom of said hopper from a position outboard said metering plate, said pair of side walls thereby forming a downwardly extending discharge chute; and
   c. A plurality of rigid distribution meshes, each mesh substantially parallel to and the same area as said metering plate and rigidly secured to both side walls of said pair, within said discharge chute, said meshes disposed one above another so granular adsorbent material exiting said hopper through said discharge chute must pass through said meshes seriatim; whereby substantially uniform density of granular adsorbent material in a filter cell being filled results by at least a portion of granular adsorbent material impinging at least one of said distribution meshes as said granular adsorbent material vacates said hopper through said holes and flows downward through said discharge chute.

2. The apparatus of claim 1, further comprising:
   a. a gate plate extending longitudinally substantially the length of said metering plate, disposed in said chute parallel to and below said metering plate but above the top-most mesh of said plurality, said gate plate having a second plurality of holes therethrough, said holes of said second plurality communicating with said holes of said first plurality when said gate plate is at a first position with respect to said metering plate, and
   b. means for vertically supporting said gate plate, rigidly affixed to said side walls and extending laterally into said chute above said mesh closest to said metering plate, said support means positioned within said chute longitudinally remote from any of said first plurality of holes so granular adsorbent material exiting said hopper through said discharge chute does not impinge said support means;
wherein said gate plate is longitudinally slideably moveable on said support means between said first position and a second position, said first position being an open position and said second position being a closed position where none of said holes of said gate plate communicate with any of said holes in said metering plate thereby preventing flow of granular adsorbent material downward out of said hopper through said metering plate.

3. The apparatus of claim 2, wherein said holes of said first plurality are spaced substantially uniformly and symmetrically over said metering plate, wherein the number of said holes of said second plurality is the same as the number of said first plurality, wherein when said gate plate is at said first position each hole of said first plurality communicates with only a corresponding single hole of said second plurality.

4. The apparatus of claim 3, further comprising a plurality of cams secured to said gate plate, extending vertically downward therefrom, positioned to contact said support means when said gate plate is at said second position, said cams being of height whereby upon longitudinal movement of said gate plate from said first position to said second position, upon said cams contacting said support means said gate plate moves vertically upward and contacts said metering plate to produce a substantially air-tight seal therebetween when said gate plate is at said second position.

5. The apparatus of claim 3, further comprising:
  a. a plurality of cams secured to said gate plate, extending vertically downward therefrom, positioned to contact said support means when said gate plate is at said second position; and
  b. a plurality of deformable sealing pads each pad secured to the upper surface of said gate plate and located thereon to coincide with and completely cover at least one hole of said first plurality of holes in said metering plate, whereby all holes of said first plurality are covered when said gate plate is at said second position;
said cams of height whereby upon longitudinal movement of said gate plate from said first position to said second position, upon said cams contacting said support means said gate plate moves vertically upward until said pads compressibly contact said metering plate, thereby affecting a substantially air-tight seal between said sealing pads and said metering plate.

6. The apparatus of claim 1, further comprising:
  a. a suction tube for insertion into a container of granular adsorbent material, having a plurality of holes at one end for suction therethrough of granular adsorbent material from said container;
  b. an inlet hose a first end thereof removably connected to said suction tube at an end remote said holes and a second end thereof removably connected to an inlet neck of said hopper;
  c. an outlet hose, one end thereof removably connected to an outlet neck of said hopper and a second end thereof removably connected to a suction inlet of a blower;
  d. a blower;
and wherein said hopper further comprises:
  e. a removable cover for closing the top of said hopper substantially air-tightly;
  f. an inlet neck extending from an inlet plenum;
  g. an inlet plenum connecting said inlet neck with a longitudinally extending portion of said hopper;
  h. an outlet plenum connecting said longitudinally extending portion of said hopper with an outlet neck;
  i. an outlet neck, extending from said outlet plenum for removably connecting said outlet plenum with said outlet hose;
  j. a hopper outlet filter screen separating said outlet plenum from said longitudinal portion of said hopper, of small mesh size to prevent flow therethrough of granular adsorbent material;
  k. baffle means fixedly connected to said hopper inlet plenum, for dispersing throughout said hopper any granular adsorbent material carried by a fluid stream entering said inlet plenum through said inlet neck, extending partially into a projected cross-sectional area of said inlet neck whereby any fluid stream entering said inlet plenum through said inlet neck impinges said baffle means;
whereby when said suction tube is inserted into a container of granular adsorbent material, said first plurality of holes are sealed substantially air-tightly and said blower is activated, granular adsorbent material in said container will be drawn, in an air granular adsorbent material mixture, through said suction tube and said inlet hose and only air will be drawn through said outlet filter screen, said hopper outlet neck, said outlet hose and through said blower, thereby resulting in the deposit of granular adsorbent material in said hopper.

7. Apparatus for filling filter cells with granular adsorbent material from above the cells to obtain uniform density in the cells, comprising:
  a. a horizontally elongated hopper for containing granular adsorbent material, said hopper including a metering plate extending longitudinally substantially the length of said hopper and forming a portion of the bottom of said hopper, said metering plate having a plurality of holes therein for downward flow therethrough of granular adsorbent material out of said hopper, said holes being distributed substantially uniformly and symmetrically over said metering plate;
  b. a plurality of extension plates projecting downwardly from said bottom of said hopper, each extension plate projecting from a position outboard said metering plate whereby half of said plurality of extension plates project downward from each side of said metering plate;
  c. a pair of side walls, each side wall perpendicular to said metering plate and secured to those extension plates which project downward from one side of said metering plate, at a position thereon remote said metering plate, said pair of side walls thereby forming a downwardly extending discharge chute;
  d. a plurality of rigid distribution meshes, each mesh substantially parallel to and the same area as said metering plate and rigidly secured to both side walls of said pair, within said discharge chute, said meshes disposed one above another so granular adsorbent material exiting said hopper through said chute must pass through said meshes seriatim;
  e. a gate plate pivotally connected to said hopper at a position outboard said holes in said metering plate, rotatable about said pivotal connection between a second position at which said gate plate is substantially horizontal and substantially parallel said metering plate and a first position at which said gate plate is substantially vertical and between one of said side walls and said metering plate, parallel to said one side wall;

whereby substantially uniform density of granular adsorbent material in a filter cell being filled results by at least a portion of granular adsorbent material impinging at least one of said distribution meshes whenever any granular adsorbent material vacates said hopper through said holes and flows downward through said discharge chute.

8. The apparatus of claim 7, wherein said gate plate at said second position contacts said metering plate in a substantially flush fashion, thereby affecting a substantially air-tight seal between said gate plate and said metering plate.

9. The apparatus of claim 7, wherein said gate plate further comprises a plurality of compressible sealing pads, affixed to said gate plate at the surface thereof which is proximate said metering plate when said gate plate is at said second position, for affecting a substantially air-tight seal between said gate plate and said metering plate when said gate plate is at said second posiion, each pad located on said gate plate to contact said metering plate and to completely cover at least one hole of said first plurality of holes in said metering plate whereby those holes of said first plurality which are above said gate plate when said gate plate is at said second position are sealed substantially air-tightly when said gate plate is at said second position.

10. Apparatus for filling filter cells with granular adsorbent material from above the cells to obtain uniform density in the cells, comprising:

a. a horizontally elongated hopper for containing granular adsorbent material, said hopper including a metering plate extending longitudinally substantially the length of said hopper and forming a portion of the bottom of said hopper, said metering plate having a plurality of holes therein for downward flow therethrough of granular adsorbent material out of said hopper, said holes being distributed substantially symmetrically and uniformly over said metering plate;

b. a plurality of extension plates projecting downwardly from said bottom of said hopper, each extension plate projecting from a position outboard said metering plate whereby some extension plates project downward from either side of said metering plate;

c. a pair of side walls, each wall perpendicular to said metering plate and secured to those extension plates which project downward from one side of said metering plate, at a position thereon remote said metering plate, said pair of side walls thereby forming a lower portion of a downwardly extending discharge chute;

d. a plurality of rigid distribution meshes, each mesh substantially parallel to and the same area as said metering plate and rigidly secured to both side walls of said pair, within said lower portion of said discharge chute, said meshes disposed one above another so any granular adsorbent material exiting said hopper through said chute must pass through said meshes seriatim;

e. a pair of gate plates, each gate plate of said pair pivotally connected to said hopper at a position outboard said holes in said metering plate, each gate plate of said pair rotatable about said pivotal connection between a second position at which said gate plate is substantially horizontal and substantially parallel said metering plate and a first position at which said gate plate is substantially vertical and between one of said side walls and said metering plate, parallel with said one of said side walls therebelow whereby said pair of gate plates, when said gate plates are in said first position, form an upper portion of said downwardly extending discharge chute, said pair of said gate plates together in said second position being congruous said metering plate, below said metering plate;

whereby substantially uniform density of granular adsorbent material in a filter cell being filled results by at least a portion of granular adsorbent material impinging at least one of said distribution meshes whenever granular adsorbent material vacates said hopper through said holes and flows downward through said discharge chute.

11. The apparatus of claim 10 wherein said gate plates at said second position contact said metering plate is substantially flush fashion, thereby affecting a substantially air-tight seal between said gate plates and said metering plate.

12. The apparatus of claim 10, wherein said gate plates further comprise a plurality of compressible sealing pads, affixed to said gate plates at the surfaces thereof which are proximate said metering plate when said gate plates are at said second position, for affecting a substantially air-tight seal between said gate plates and said metering plate when said gate plates are at said second position, each pad located on one of said gate plates to contact said metering plate and to completely cover at least one hole of said first plurality of holes in said metering plate.

* * * * *